US006836298B2

(12) United States Patent
Song et al.

(10) Patent No.: US 6,836,298 B2
(45) Date of Patent: Dec. 28, 2004

(54) APPARATUS AND METHOD FOR CORRECTING DISTORTION OF IMAGE AND IMAGE DISPLAYER USING THE SAME

(75) Inventors: Woo Jin Song, Seoul (KR); Kyu Young Hwang, Pusan (KR); Hyun Chool Shin, Seoul (KR); Chung Hee Lee, Taeku (KR); Jong Hwa Kim, Kumi (KR)

(73) Assignee: LG Electronics Inc., Seoul (KR)

( * ) Notice: Subject to any disclaimer, the term of this patent is extended or adjusted under 35 U.S.C. 154(b) by 513 days.

(21) Appl. No.: 09/736,194

(22) Filed: Dec. 15, 2000

(65) Prior Publication Data

US 2002/0164083 A1 Nov. 7, 2002

(30) Foreign Application Priority Data

Dec. 18, 1999 (KR) ........................................ 1999-58980
Dec. 7, 2000 (KR) ........................................ 2000-74172

(51) Int. Cl.[7] .............................. H04N 3/23; H04N 3/22; H04N 9/28
(52) U.S. Cl. ...................... 348/745; 348/746; 348/807
(58) Field of Search ................................ 348/745, 746, 348/747, 806, 807; 382/275, 308; 345/14; 315/368.11, 368.12, 368.13, 370; H04N 3/22, 3/26, 3/23, 3/223, 3/227, 9/28

(56) References Cited

U.S. PATENT DOCUMENTS

| | | | |
|---|---|---|---|
| 5,091,773 A | | 2/1992 | Fouche et al. |
| 5,231,481 A | | 7/1993 | Eouzen et al. |
| 5,444,500 A | * | 8/1995 | Ten Pierick et al. ........ 348/807 |
| 5,475,447 A | | 12/1995 | Funado |
| 5,532,764 A | | 7/1996 | Itaki |
| 6,310,650 B1 | * | 10/2001 | Johnson et al. ............. 348/383 |
| 6,480,242 B1 | * | 11/2002 | Okada et al. ............... 348/807 |
| 6,496,231 B1 | * | 12/2002 | Pronkine .................... 348/745 |
| 2001/0017687 A1 | | 8/2001 | Rodriguez, Jr. et al. ...... 353/70 |

FOREIGN PATENT DOCUMENTS

| | | | |
|---|---|---|---|
| EP | 0 756 425 A2 | 1/1997 | ............ H04N/9/31 |
| EP | 0 448 480 A1 | 9/1999 | |
| JP | 06-006816 | 1/1994 | |
| JP | 07-067125 | 3/1995 | |
| JP | 07 067125 | 3/1995 | |
| JP | 07-264608 | 10/1995 | |
| JP | 07-336702 | 12/1995 | |
| JP | 8-201913 | 8/1996 | |
| WO | WO 97/48232 | 12/1997 | |

OTHER PUBLICATIONS

Combined Search and Examination Report under Sections 17 and 18(3).
UK Search and Examination Report under Sections 17 and 18(3); GB 0030659.7, (5 pp), dated Jun. 26, 2001.

* cited by examiner

*Primary Examiner*—Sherrie Hsia
(74) *Attorney, Agent, or Firm*—Fleshner & Kim, LLP

(57) ABSTRACT

An apparatus and a method for correcting a distorted image is capable of correcting an optical distortion of an image and misconvergence by prewarping an inputted image without using a convergence yoke, and an image displayer using the same. The apparatus for correcting an image distortion for an image displayer in which an image signal is inputted to display an image on a screen and an image distortion is corrected, includes: a reference image generator for generating a predetermined reference image; a camera for inputting the reference image and photographing an image outputted on the screen; and a distortion information extracting unit for comparing the photographed image outputted from the camera and the reference image outputted from the reference image generator, and generating distortion correction information to correct a distortion of the photographed image in case that the image has been distorted.

17 Claims, 13 Drawing Sheets

APPARATUS AND METHOD FOR CORRECTING DISTORTION OF IMAGE AND IMAGE DISPLAYER USING THE SAME

BACKGROUND OF THE INVENTION

1. Field of the Invention

The present invention relates to an image distortion correction of an image displayer, and more particularly, to an apparatus and a method for correcting a distorted image which is capable of correcting an optical distortion of an image and misconvergence by prewarping an inputted image without using a convergence yoke, and an image displayer using the same.

2. Description of the Background Art

These days, a television set is a requite item of electronic appliances. Thus, as the standard of living is improved, a high quality of television set is increasingly demanded. In order to meet the demands, there have been developed high quality television sets, one of which is a projection TV in which an image focused on a red, a green and a blue cathode ray tubes is enlarged, the enlarged image is reflected on a mirror and the image reflected on the mirror is projected on a large screen, so that viewers can watch an enlarged TV image.

FIG. 1A is a view showing a construction of a general projection TV 100, which includes a red, a green and a blue cathode ray tubes (CRTs) 3, 4 and 5, a lens 6 for enlarging images outputted from the CRTs 3, 4 and 5, a mirror 1 for making incident and reflecting the images, and a screen 2 for displayed the images reflected and enlarged from the mirror 1.

Images outputted from the CRTs 3, 4 and 5 is transmitted through the lenses 6 respectively attached to the CRTs 3, 4 and 5 and reflected on the mirror 6 to reach the screen 2 of the projection TV 100, thereby being displayed as an enlarged image.

However, since the image displayed on the screen of the projection TV 100 is influenced by the position and angle of the plural CRTs and the optical elements, an optical distortion is inevitably created for the image.

FIG. 1B is a view showing trajectories of images displayed on the screen 2 of FIG. 1A. Depending on the relations between positions of the CRTs 3, 4 and 5 and the position of the mirror, the red, the green and the blue image trajectories do not agree to each other, and the image trajectories are distorted or angulated.

The optical distortion has a non-linear characteristic due to the several factors such as the position of the CRTs and the mirror, a magnifying power of the lens and a magnetic field. The optical distortion is divided into a pincushion distortion caused by the CRT and the lens as shown in FIG. 2A, and a keystone distortion caused due to the reflection of the mirror as shown in FIG. 2B.

The pincushion distortion is a distortion generated as the proceeding distance of electron beams generated and outputted from the CRT (specifically, an electron gun) is away from the center of the CRT The degree of the distortion becomes severe as it goes away from the center of the CRT Meanwhile, the keystone distortion is that an image is reflected on different spots of a mirror according to lenses and the reflection path from the mirror to the screen is different. For example, a rectangular-shaped original image is distorted to a trapezoidal image. The key stone distortion is evenly generated on the whole image displayed on the screen.

Especially, when the red, the green and the blue CRTs are arranged, as shown in FIG. 1B, the electron beams outputted from the blue CRT and the red CRT are made diagonally incident on the mirror, so that a keystone distortion occurs more severely, compared with the electron beam outputted from the green CRT which is made directly incident on the mirror.

Accordingly, in case of the projection TV, since the three CRTs are arranged side by side, rather than being installed at the same position, the pincushion distortion and the keystone distortion degree are changed according to the right, left, upper and lower portions of the image. In addition, the projection TV has a problem of misconvergence in that since the three color signals are not projected on the same spot, a desired color image is hardly obtained. In this respect, the misconvergence occurs together with the optical distortion.

FIG. 3 is a schematic block diagram of an apparatus for correcting an image distortion of an image displayer in accordance with a conventional art As shown in the drawing, the apparatus for correcting an image distortion includes an image processor 11 for processing a signal received from an external source and outputting an image signal and a horizontal and a vertical synchronous signals; a CRT 12 for receiving the image signal and generating an electron beam; a horizontal and a vertical deflection unit 16 for receiving the horizontal and the vertical synchronous signal and outputting a convergence control signal and a horizontal and a vertical deflection control signals; a deflection yoke (DY) 14 attached to the CRT 12 for flowing current for horizontal and vertical deflection of an electron beam according to the horizontal and the vertical deflection control signals; a correction wave form generator 17 for receiving the convergence control signal and outputting a convergence correction signal; a conversion amplifier 18 for inputting the correction signal and outputting an amplified correction signal; a convergence yoke (CY) 13 attached to the CRT 12 for flowing current so as not to spread electron beams outputted from the CRT; and an optical system 15 for making incident the electron beams outputted from the CRT 12 and displaying an image.

According to the apparatus for correcting a distortion of an image in accordance with the conventional art, a lump of coils such as the convergence yoke or the deflection yoke are installed at the CRT, and an appropriate correction current of a horizontal and a vertical directions is applied to the convergence yoke (the intensity of the current is controlled) to thereby control a path of the electron beam, so that the optical distortion is corrected and the convergence of the color signal is controlled.

That is, in order to control the electron beams outputted from the RGB CRTs, a deflection controlling current is produced for each RGB CRT lens. And then, the current is greatly amplified and applied to the convergence yoke, by which the electron beam landed on the screen is controlled to be converted on the same spot, not being spread However, in the distortion correcting apparatus, the image distortion generated in the projection TV has a non-linear characteristic. Thus, in order to obtain a current to be applied to the convergence yoke, a control signal having a non-linearity is to be generated, for which an amplifier for amplifying the current is to be provided and a complex and difficult operation algorithm should be implemented.

In addition, in case of the conventional projection TV in which the distortion is corrected by varying a landing of the electron beam according to the controlling of the current, even though the distortion is corrected by distortion correcting apparatuses before coming out to the market, as time goes by, the distortion correcting apparatuses are influenced by parts degradation, a temperature change and an earth magnetic field. Thus, a distortion phenomenon occurs, deteriorating its performance. In addition. Once the distortion in the projection TV occurs, it is not possibly corrected.

SUMMARY OF THE INVENTION

Therefore, an object of the present invention is to provide an apparatus and method for correcting an image distortion of an image displayer which is capable of controlling an image displayer so as to correct a distortion and output an original image without using a convergence yoke.

Another object of the present invention is to provide an image displayer which is capable of correcting a distortion to output an original image without using a convergence yoke.

Still another object of the present invention is to provide a method for correcting an image distortion of an image displayer which is capable of correcting a distortion and outputting an original image without using a convergence yoke.

To achieve these and other advantages and in accordance with the purpose of the present invention, as embodied and broadly described herein, there is provided an apparatus for correcting an image distortion for an image displayer in which an image signal is inputted to display an image on a screen and an image distortion is corrected, including, a reference image generator for generating a predetermined reference image; a camera for inputting the reference image and photographing an image outputted on the screen; and a distortion information extracting unit for comparing the photographed image outputted from the camera and the reference image outputted from the reference image generator, and generating distortion correction information to correct a distortion of the photographed image in case that the image has been distorted.

To achieve the above objects, there is also provided a method for correcting an image distortion including the steps of: detecting distortion parameters obtained by comparing a reference image with a distorted image displayed on a screen, which is distorted from the reference image; and correcting the distorted image by using the detected distortion parameters. To achieve the above objects, there is also provided an image displayer including: an image processor for receiving an image signal from an external source and processing it to obtain a digital image signal; a prewarping unit for prewarping the image signal outputted from the image processor; and a display unit for receiving the prewarped image and displaying an image without distortion.

To achieve the above objects, there is also provided a method for correcting a distorted image including the steps of: prewarping an inputted image by using pre-set distortion correction information; and displaying the same image as the inputted image.

The foregoing and other objects, features, aspects and advantages of the present invention will become more apparent from the following detailed description of the present invention when taken in conjunction with the accompanying drawings.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE PREFERRED EMBODIMENTS

Reference will now be made in detail to the preferred embodiments of the present invention, examples of which are illustrated in the accompanying drawings.

The present invention is directed to a distortion correcting apparatus in which an image is distorted in advance, in consideration of a distortion to be made when an image signal stored in a field or in a frame memory is projected on a screen from a lens of a CRT, and projected on the screen, thereby displaying an original image, and it's method.

Figure 1A:
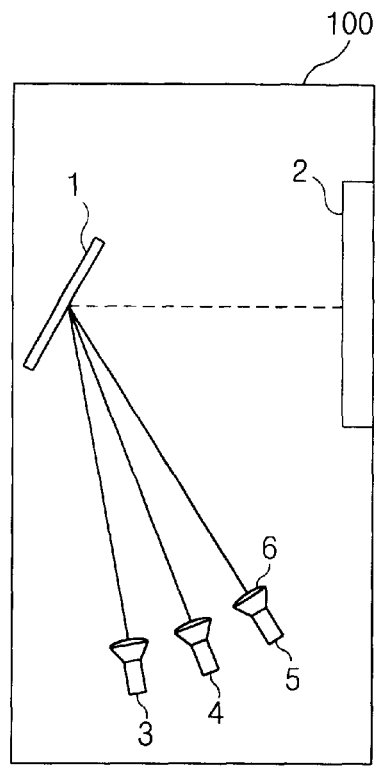
FIG. 1A is a view showing a construction of a general projection TV in accordance with a conventional art.
Figure 1B:
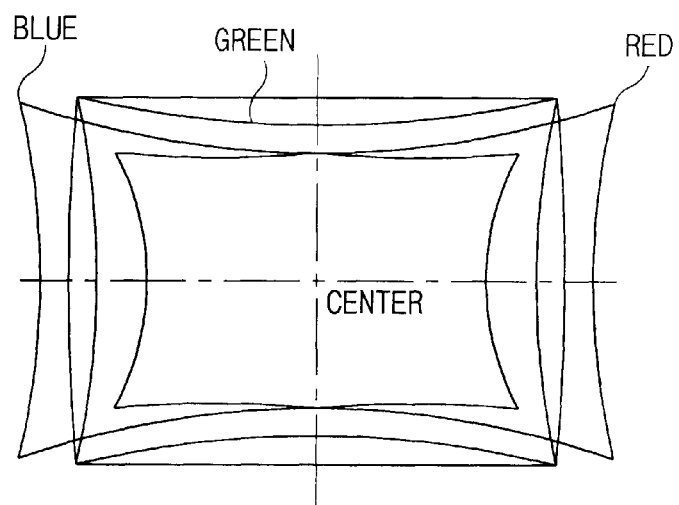
FIG. 1B is a view showing trajectories of images displayed on a screen of the projection TV of FIG. 1A in accordance with the conventional art.
Figure 2A:
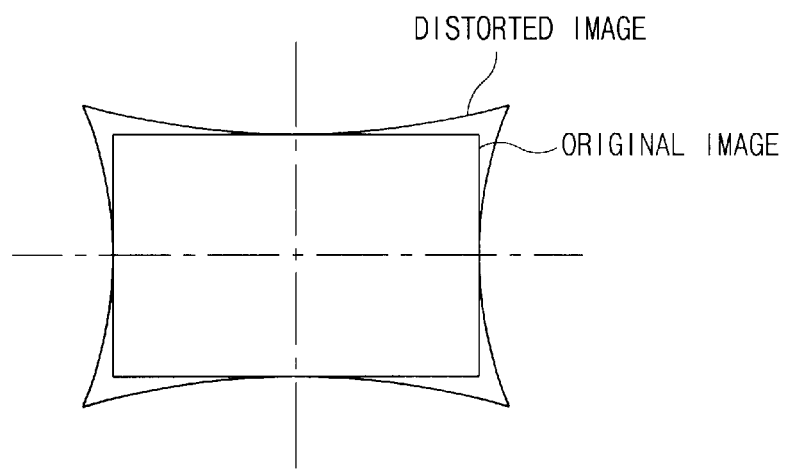
FIG. 2A shows an example of a pincushion distortion.
Figure 2B:
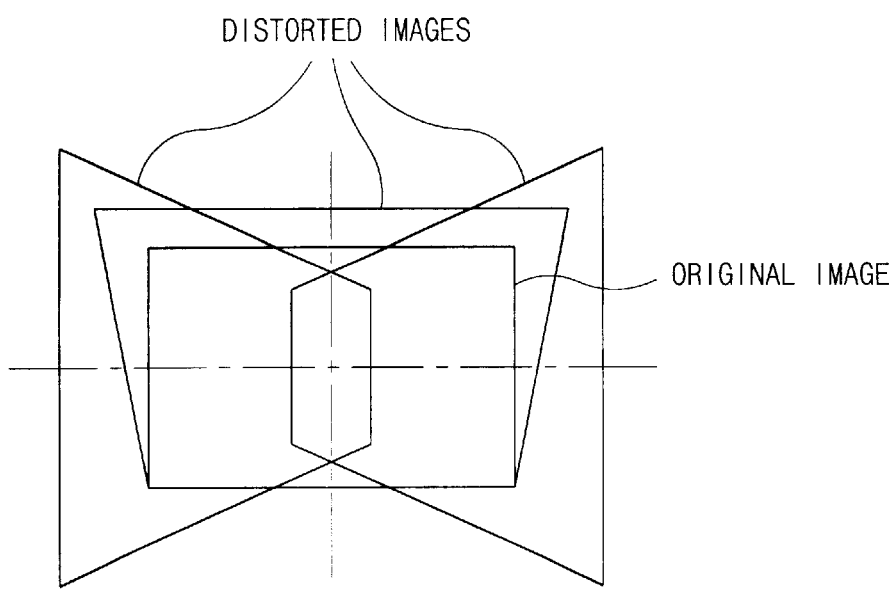
FIG. 2B shows an example of a keystone distortion.
Figure 3:
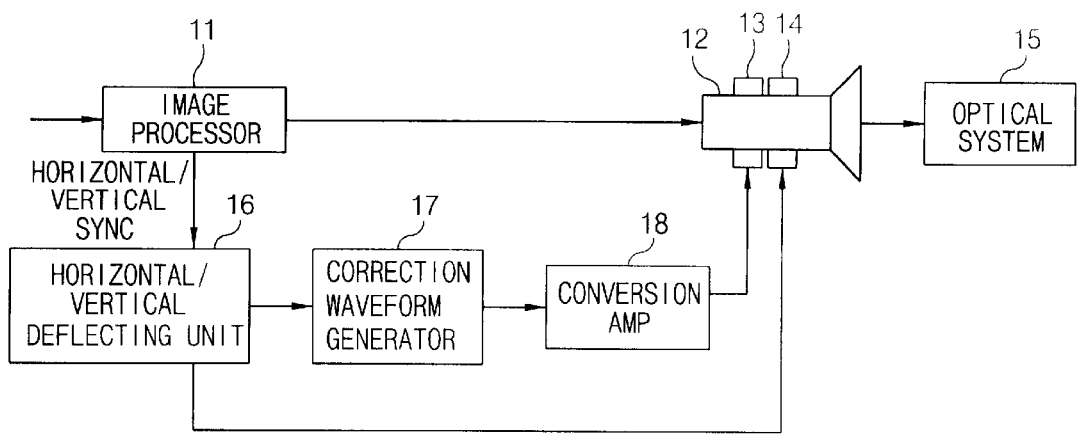
FIG. 3 is a schematic block diagram of an apparatus for correction a distorted image of an image displayer in accordance with the conventional art.
Figure 4:
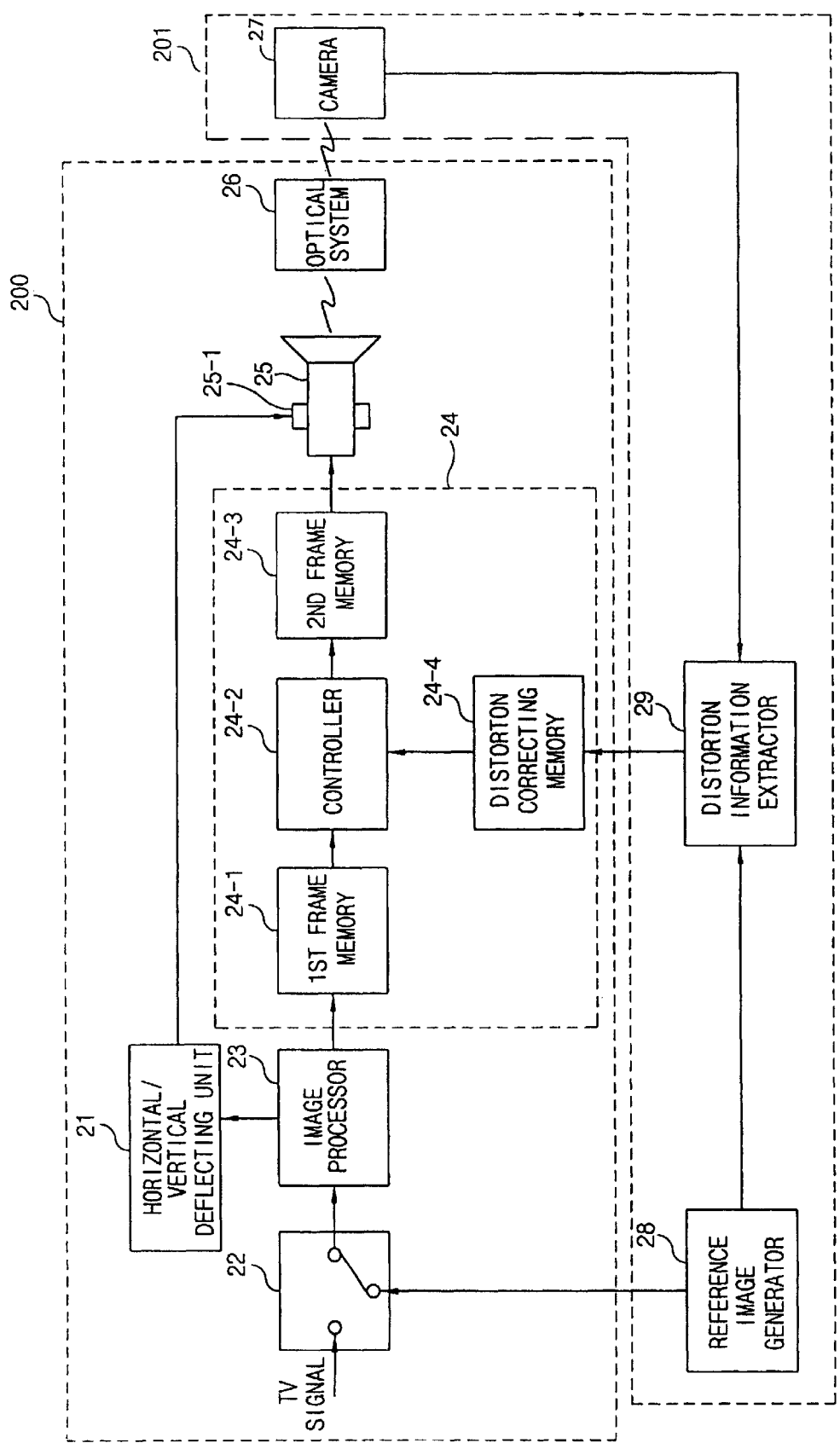
FIG. 4 is a schematic block diagram of a distorted image correcting apparatus for detecting and correcting a distorted image of an image displayer in accordance with the present invention.

FIG. 4 is a schematic block diagram of a distorted image correcting apparatus for detecting and correcting a distorted image of an image displayer in accordance with the present invention, which includes an image displayer 200 for correcting a distorted image and outputting a corrected image; and a distortion information extracting unit 201 for extracting distortion information required for correcting the distorted image and storing it in a distortion correcting memory.

The image displayer, that is, the projection TV 200, includes an image processor 23 for processing a signal received from a signal source and outputting an image signal, a horizontal or a vertical synchronous signal; a horizontal/vertical deflection unit 21 for receiving the horizontal or the vertical synchronous signal and outputting a horizontal or a vertical deflection control signal; a first frame memory 24-1 for storing a data in a frame unit outputted from the image processor 23; a distortion correcting memory 24-4 for storing distortion correction information extracted from a distortion information extractor 29 included in a distortion information extracting unit 201 (to be described); a controller 24-2 for prewarping the image stored in the first frame memory 24-1 by using the distortion correction information stored in the distortion correcting memory 24-4; a second frame memory 24-3 for storing the image prewarped by the controller 24-2; a CRT 25 for receiving the data outputted from the second frame memory 24-3 and outputting an electron beam; a deflection yoke (DY) 25-1 attached to the CRT 25 for controlling the electron beam outputted from the CRT 25; and an optical system 26 for receiving the electron beam controlled by the deflection yoke 25-1 and displaying an enlarged image.

The projection TV 200 further includes a switch 22 installed before the image processor 23, so as to input a reference image required for extracting distortion information.

In order to extract distorted image correction information of the projection TV 200, the distortion information extracting unit 201 of the image displayer of the present invention includes a reference image generator 28 for generating and providing a reference image to the switch 22 of the projection TV 200; a camera 27 for photographing an image outputted from the optical system 26 when the image displayer 200 received the reference image outputs the reference image from the optical system 26; and a distortion information extractor 29 for receiving the image photographed by the camera 27 and the reference image outputted from the reference image generator 28, comparing the photographed image and the reference image and generating distortion correction information.

The method for extracting the image distortion information of the projection TV 200 and generating the distortion correction information on the basis of the distortion information by the distortion information extracting unit 201 of the present invention constructed as described above will now be explained with reference to FIGS. 5 through 7.

Figure 5A:
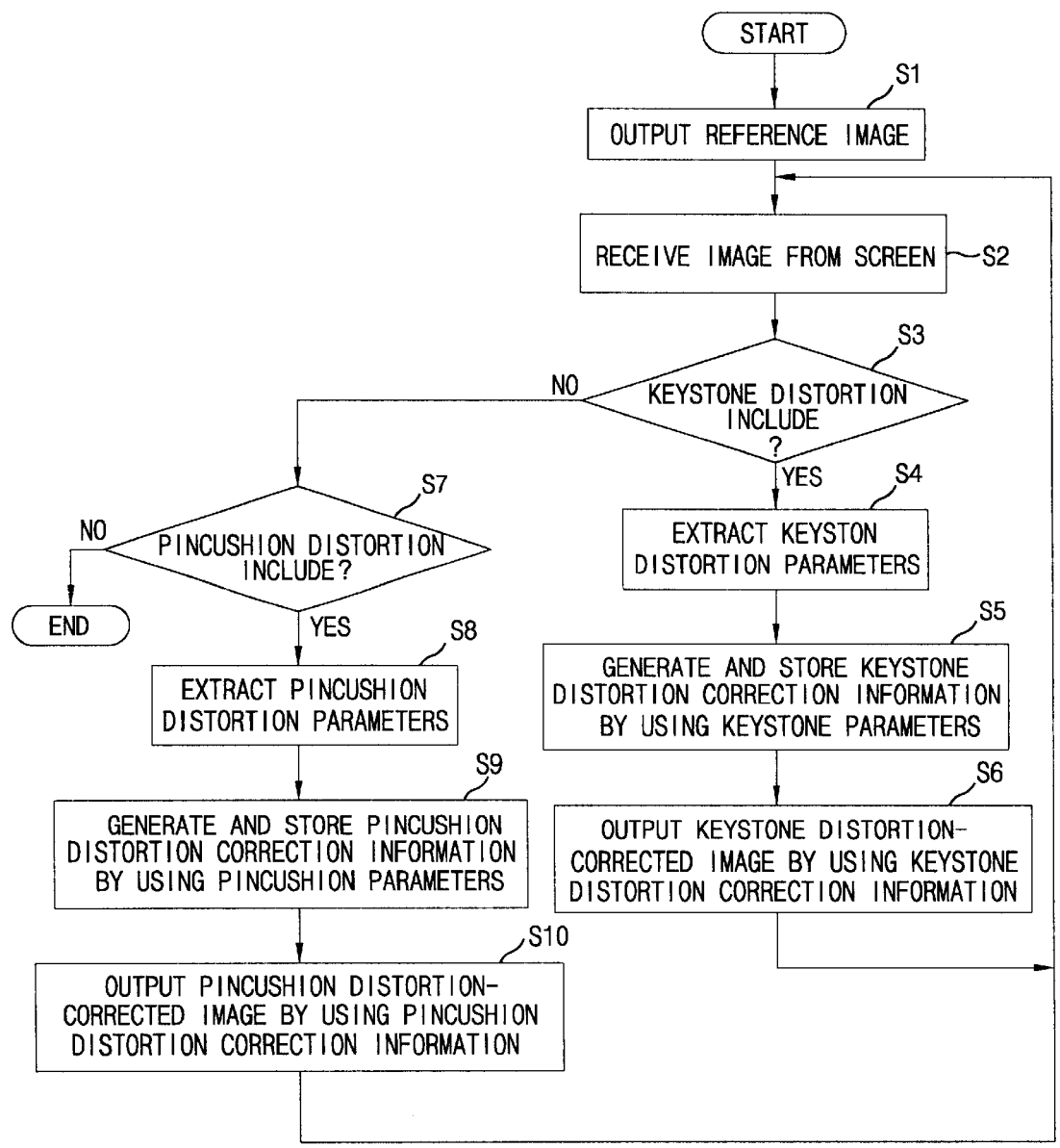
FIGS. 5A and 5B are flow charts of methods for correcting an image of a distorted image correcting apparatus in accordance with the present invention.
Figure 5B:
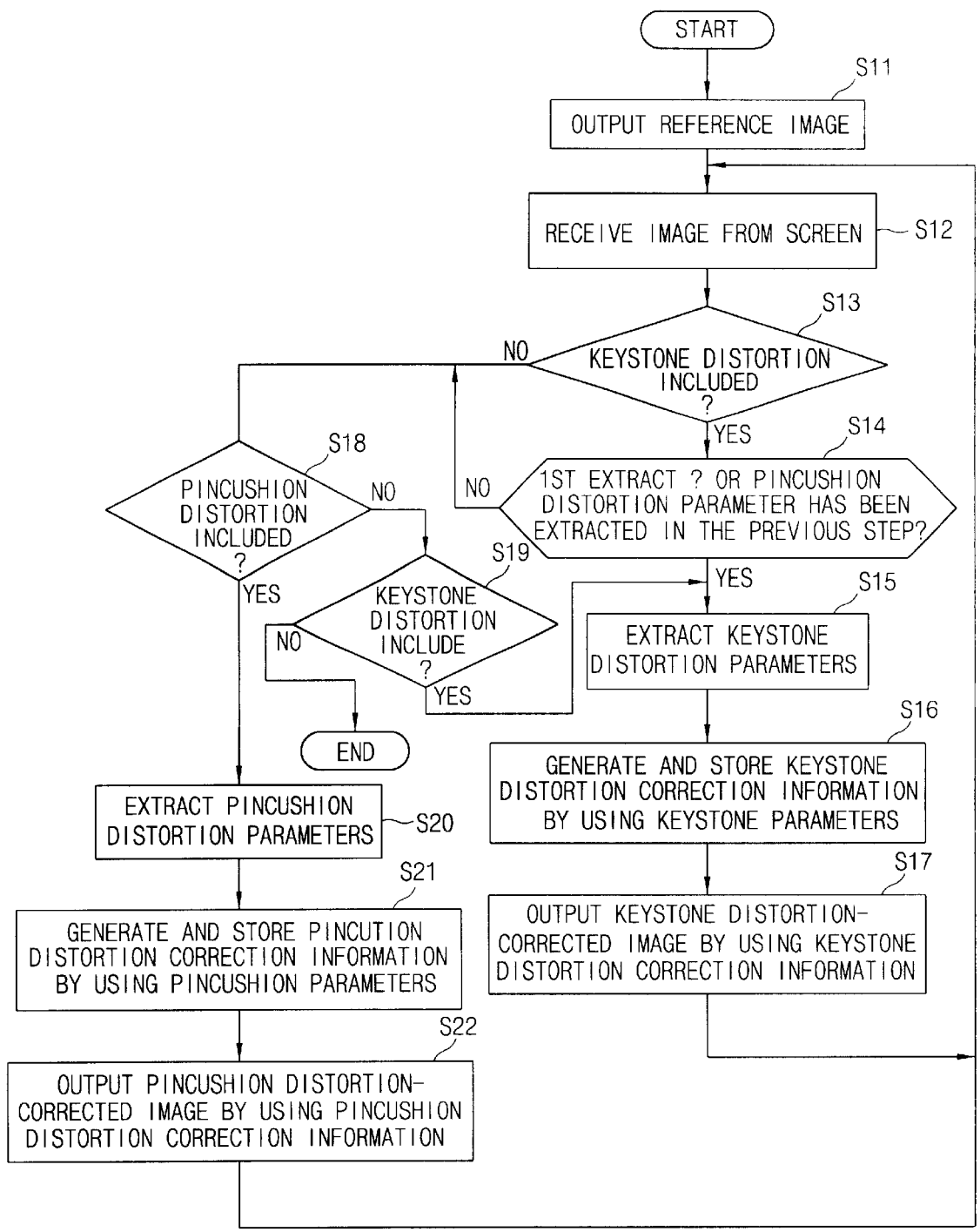

First, in a method for generating distortion correction information, since the image displayed on the screen of the projection TV is a keystone distortion and a pincushion distortion combined image, in a state that one distortion is completely corrected, the other distortion correction information is obtained with reference to FIG. 5A, or with reference to FIG. 5B, the two kinds of distortions are simultaneously corrected, and at the same time, the two distortion correction information are updated, to finally obtain two distortion correction information.

FIGS. 5A and 5B are flow charts of methods for correcting an image of a distorted image correcting apparatus in accordance with the present invention.

Figure 6A:
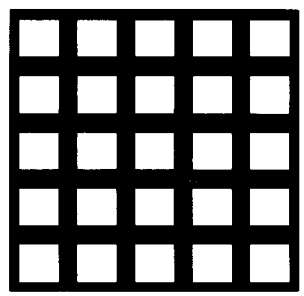
FIGS. 6A through 6D show images generated during image correcting process of the distorted image correcting apparatus.
Figure 6B:
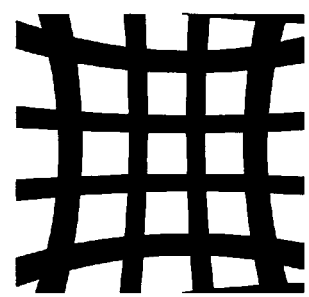

First, when the reference image generator 28 outputs a reference image (a grid image) as shown in FIG. 6A to the switch 22 of the projection TV, the reference image is keystone-distorted and pincushion-distorted while passing through the switch 22, the CRT 25 and the optical system 26, and displayed on the screen (not shown) of the optical system 26 as shown in FIG. 6B (S1).

At this time, the camera 27 aligned ahead of the screen of the optical system 26 photographs the distorted reference image displayed on the screen and outputs it to the distortion information extractor 29 (S2).

The distortion information extractor 29 receives and compares the distorted reference image and the reference image outputted from the reference image generator 28 and judges whether there is a keystone distortion in the distorted reference image (S3). Upon judgement, if there is a keystone distortion, the distortion information extractor 29 extracts a keystone distortion parameter (S4)

The extracted keystone distortion parameter is stored in the distortion correcting memory 24-4, and the controller 24-2 warps the image of the first frame memory 24-1 by using the distortion parameter outputted from the distortion correcting memory 24-4 and outputs it to the second frame memory 24-3. Then, the second frame memory 24-3 renders the reference image of which keystone distortion has been corrected, to be displayed through the CRT 25 and the optical system 26 (S5 and S6).

Figure 6C:
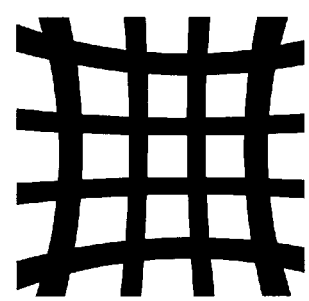

The steps S1~S6 are repeatedly performed to update the keystone distortion parameter until the keystone distortion is not extracted anymore As the steps S1~S6 are repeatedly performed and no keystone distortion is extracted, a reference image as shown in FIG. 6C is outputted which includes only a pincushion distortion without a keystone distortion.

A pincushion distortion parameter is obtained in the same manner. That is, when a reference image having a pincushion distortion as shown in FIG. 6C is photographed by the camera 27 and outputted, the distortion information extractor 29 receives and compares the distorted reference image and the reference image outputted from the reference image generator 28, to judge whether there is a pincushion distortion in the distorted reference image (S7).

In case that there is a pincushion, the distortion information extractor 29 extracts a pincushion distortion parameter (S8). The extracted pincushion distortion parameter is stored in the distortion correcting memory 24-4, and the controller 24-2 which received the distortion parameter from the distortion correcting memory 24-4 warps the image of the first frame memory 24-1 by using the pincushion distortion parameter and outputs it to the second frame memory 24-3.

Then, the second frame memory 24-3 renders the pincushion distortion-corrected reference image to be displayed through the CRT and the optical system (S9, S10).

The steps (S1, S2, S3, S7, S8, S9 and S10) are repeatedly performed to update a pincushion distortion parameter until the pincushion distortion is not extracted any more.

Figure 6D:
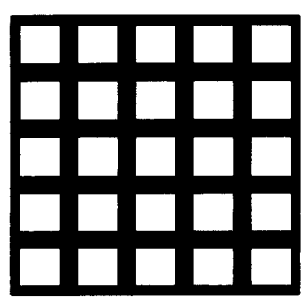

Accordingly, the keystone distortion and the pincushion distortion of the reference image are corrected as shown in FIG. 6D so that it is identical to the reference image inputted by the reference image generator 28.

Referring to the method for extracting distortion correction information of FIG. 5A, after one distortion is completely correct, a coordinate of an image to be displayed on the screen should be measured to obtain an accurate parameter.

For example, first, a pincushion (or a keystone) distortion is to be completely corrected, and then a coordinate of an image to be displayed on the screen should be measured in order to obtain a keystone (or a pincushion) distortion parameter.

However, in a state that one distortion is completely corrected, it is difficult to extract a coordinate. Thus, a method is employed in which one distortion is roughly performed and then a process for obtaining a parameter of another distortion is repeatedly performed to update the previously obtained distortion correction parameters, which will now be described with reference to FIG. 5B.

FIG. 5B is a flow chart of a method for extracting a distortion correction information.

In case of the keystone distortion, the distortion occurs evenly on the entire screen of the projection TV, while, in case of the pincushion distortion, the distortion becomes severe as it goes away from the center of the screen. Thus, in case that a coordinate is extracted from the central portion of the screen to measure the degree of the distortion, the keystone distortion is evenly formed, while, the pincushion distortion is relatively less formed. Accordingly, at the central portion of the screen the keystone distortion parameter is almost the same as a keystone distortion parameter obtained in a state that the pincushion distortion is completely corrected.

After the keystone distortion parameter is roughly obtained, a keystone prewarping image is generated by using the obtained keystone distortion parameter, based on which the keystone distortion is corrected and outputted to the screen. At this time, the image displayed on the screen is an image of which keystone distortion has been corrected to a degree, from which when predetermined coordinates are extracted, a rough pincushion distortion parameter can be obtained.

After the pincushion distortion parameter is roughly obtained, the pincushion distortion is corrected by using the obtained pincushion distortion parameter. Then, an image having a less pincushion distortion than the previously displayed image is displayed on the screen, from which a relatively more accurate keystone distortion parameter can be obtained.

Accordingly, when a distortion correction is performed by using the relatively more accurate keystone distortion parameter as obtained, an even more accurate pincushion distortion parameter than the pincushion distortion parameter obtained in the previous step can be obtained.

In this manner, the keystone distortion and the pincushion distortion are repeatedly corrected until the keystone distortion and the pincushion distortion are completely corrected, so that final keystone distortion correction information and final pincushion distortion correction information can be obtained, which will now be described.

First, when the reference image generator 28 outputs a reference image (a grid image) as shown in FIG. 6A to the switch 22 of the projection TV, the reference image is keystone-distorted and pincushion-distorted after passing through the switch 22, the CRT 25 and the optical system 26, and displayed on the screen (not shown) of the optical system 26 as an image as shown in FIG. 6B (S11).

At this time, the camera 27 aligned ahead of the screen of the optical system 26 photographs the distorted reference image being displayed on the screen and outputs it to the distortion information extractor 29 (S12).

The distortion information extractor 29 receives and compares the distorted reference image and the reference image outputted from the reference image generator 28 to judge whether there is a keystone distortion in the distorted reference image (S13). Upon judgement, if there is a keystone distortion, the distortion information extractor 29 judges whether a distortion parameter is first extracted, or a pincushion distortion parameter has been previously extracted (S14).

Either in case that a distortion parameter is first extracted, or in case that a pincushion parameter has been previously extracted, a keystone distortion parameter is extracted (S15). The extracted keystone distortion parameter is stored in the distortion correcting memory 24-4 (S16).

Then, the controller 24-2 warps the image of the first frame memory 24-1 by using the distortion parameter outputted from the distortion correcting memory 24-4, and outputs it to the second frame memory 24-3. And then, the second frame memory 24-3 displays the keystone distortion-corrected reference image through the CRT 25 and the optical system 26 (S17), and the camera 27 photographs the keystone distortion-corrected reference image displayed on the screen and outputs it to the distortion information extractor 29 (S12), and the process is repeatedly performed.

Then, the distortion information extractor 29 receives the keystone distortion-corrected reference image from the camera 27 and judges whether there is a keystone distortion therein. Upon judgement, if there is a keystone distortion, the distortion information extractor 29 judges whether a distortion parameter is first extracted or whether a pincushion distortion parameter has been extracted in the previous stage. Upon judgement, in case that it is the first extraction or in case that a pincushion distortion parameter has been extracted in the previous stage, the steps S15, S16, S17 and S12 are performed as described above.

Meanwhile, in case that it is the first extraction, or in case that no pincushion distortion parameter has been extracted, or in case that there is no keystone distortion, it is judged whether there is a pincushion distortion in the photographed image (S18). Upon judgement, in case that there is a pincushion distortion, a pincushion distortion parameter is extracted (S20) and stored in the distortion correcting memory 24-4 (S21).

Then, the controller 24-2 warps the image of the first frame memory 24-1 by using the pincushion distortion parameter outputted from the distortion correcting memory 24-4 and outputs it to the second frame memory 24-3.

Then, the second frame memory 24-3 displays the pincushion distortion-corrected reference image through the CRT 25 and the optical system 26 (S22), and the camera 27 photographs the pincushion distortion-corrected reference image displayed on the screen and outputs it to the distortion information extractor 29 (S12), and the process is repeatedly performed.

Meanwhile, it is judged whether there is a pincushion distortion. Upon judgement, in case that there is no pincushion, it is judged whether there is a keystone distortion (S19). Upon judgement, in case that there is a keystone distortion, a keystone distortion parameter is extracted and a keystone distortion correction information is generated by using the keystone distortion parameter and stored, and then, the keystone distortion-corrected image is outputted (S15, S16 and S17).

Meanwhile, it is judged whether there is a keystone distortion (S19), and in case that that there is no keystone distortion, the step of generating the keystone distortion correction information and the pincushion distortion correction information is terminated.

Accordingly, in the method for extracting distortion correction information of FIGS. 5A and 5B, the distortion information generated in the image displayer is extracted, based on which the distortion correction information is generated.

And, in the method for extracting distortion correction information, only the D keystone distortion parameter and the pincushion distortion parameter are obtained and stored in the distortion correcting memory 24-4, and the controller warps the image stored in the first frame memory 24-1 on a real time basis by using only the keystone distortion parameter and the pincushion distortion parameter. Accordingly, the distortion correcting memory 24-4 does not need to store a relatively large amount of data, for which, thus, a small capacity of memory can be advantageously used.

However, it has a problem in that, since the controller 24-2 is to compute an image to be displayed on a real time basis by using the distortion parameters, it must have a high speed.

Therefore, in order to solve the problem, the distortion correction information stored in the distortion correcting memory 24-4 can be pixel mapping information which is computed by using the distortion parameter. In this case, since the pixel mapping information has a voluminous data, it needs a large capacity of distortion correcting memory, but, since a short time is taken to warp the image stored in the first frame memory by using the pixel mapping information, the warping processing is speedy.

A mathematical modeling of the keystone distortion and a mathematical modeling of the pincushion distortion to obtain the keystone distortion correction information and the pincushion distortion correction information by correcting the keystone distortion and the pincushion distortion will now be described in detail on the basis of the keystone distortion parameter and the pincushion distortion parameter.

1) Mathematical Modeling of a Keystone Distortion Performed on the Basis of the Keystone Distortion Parameter:

A keystone distortion is mathematically modeled by using a well-known projection transformation according to its characteristics. That is, the projection transformation includes all kinds of transformation such as transformation from a rectangle to an arbitrary quadrangle (i.e., trapezoid, etc) as well as transformation of a translation, a rotation and a scaling, which is suitable for modeling the characteristics of the keystone distortion.

Assuming that (U, V) is a coordinate of an original image, (X', Y', Z') is a temporary coordinate, and (X, Y) is a coordinate of a distorted image, a keystone modeling is expressed by the following equation (1).

$$\begin{bmatrix} X' \\ Y' \\ Z' \end{bmatrix} = K \begin{bmatrix} U \\ V \\ 1 \end{bmatrix} \quad (1)$$

$$\text{Wherein } K = \begin{bmatrix} k_{11} & k_{12} & k_{13} \\ k_{21} & k_{22} & k_{23} \\ k_{31} & k_{32} & 1 \end{bmatrix}, X = X'/Z', Y = Y'/Z'.$$

However, it is difficult to extract a coordinate of a distorted image from the TV screen to directly obtain a distortion parameter. Thus, the keystone distortion existing on the TV screen is divided into a combination of various basic transformation such as translation, scaling and quadrangle transformation and then parameters are obtained corresponding to each transformation, based on which the overall keystone distortion parameter is obtained.

The keystone distortion appearing on the TV screen is classified into a distortion that a center of an RGB is dislocated and a distortion that a rectangle is slanted The two kinds of distortions are independently processed In case where a coordinate is extracted from the TV screen, generally the center of the screen is determined as a reference and the centers of the RGB images are displayed on the screen, according to which it is easy to extract a distortion parameter.

Therefore, the centers of the RGB images are adjusted through a inverse-transformation of the translation, and then the slanted quadrangle is forced to be changed to a rectangle, according to which the distortion can be corrected.

In this respect, assuming that a parameter concerned with the center shift of the RGB images is $K_1$ and the distortion making the rectangular image slanted is $K_2$, the overall keystone distortion parameter is expressed by the following equation (2).

$$K = K_2 \times K_1 \quad (2)$$

In case where an image is translated by a predetermined transformation (i.e., an affine transformation) to shift the center, two variables are to be obtained.

Accordingly, it is necessary to obtain just a pair of coordinates, for which the central coordinate of the screen and the central coordinate of a distorted image appearing on the TV screen are obtained. And then when a displacement between the two points, its distortion parameter can be easily obtained.

For example, assuming that a central coordinate of the screen is $(C_x, C_y)$ and a central coordinate of a distorted-image is (m, n), since the central coordinate of the screen is distorted by the translation, a distortion parameter of the center shift is obtained by the following equation (3).

$$K_1 = \begin{bmatrix} 1 & 0 & m - C_x \\ 0 & 1 & n - C_y \\ 0 & 0 & 1 \end{bmatrix} \quad (3)$$

After the distortion parameter of the center shift is obtained, when a inverse-transformation is performed by using the distortion parameter, the centers of the RGB images agree with each other. That is, a parameter of the rectangle distortion is extracted, and then the image is inversely transformed by using the distortion parameter, to thereby correct a keystone distortion.

In case of the rectangle distortion, since it falls to the projection transformation, 8 parameters are required therefor, for which, thus, 4 pairs of coordinates need to be extracted.

When a coordinate is extracted from the TV screen, an actual image appearing on the screen is a slantingly distorted image. However, a pair of actual coordinates to be-obtained to obtain a distortion parameter includes a coordinate of an image before distortion as well as a coordinate of the distorted image. Thus, it is necessary to infer a coordinate of the image before distortion by using the distorted image.

Figure 8:
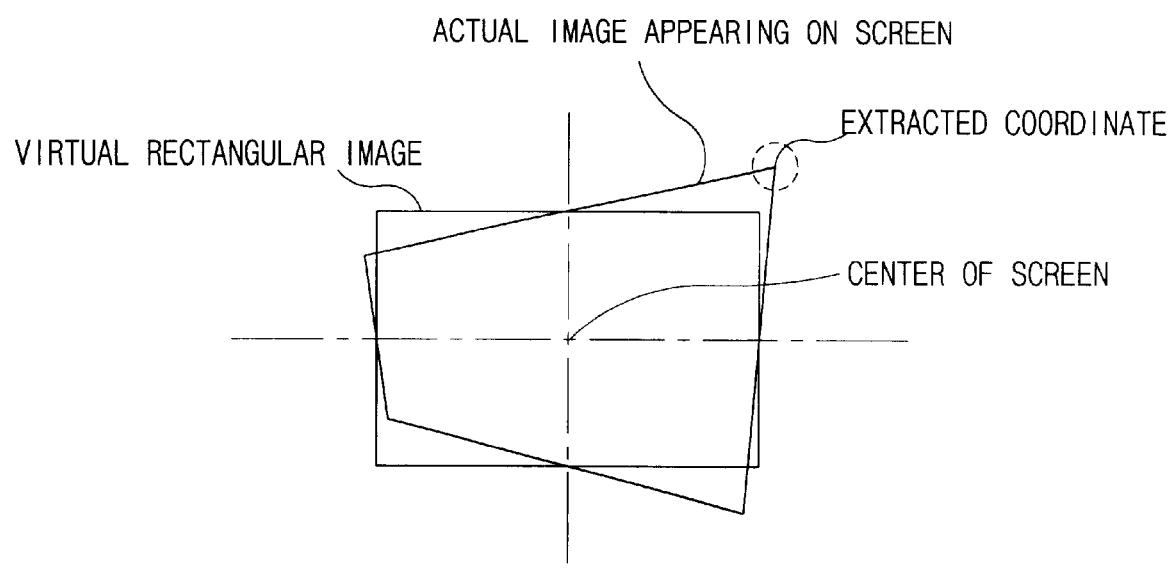
FIG. 8 is a view showing coordinate extracting method of a keystone distorted image in accordance with the present invention.

FIG. 8 shows extraction of a coordinate from a keystone-distorted image.

As performed in the previous step, after the center of an image is adjusted to agree with the center of the screen, two axes are made passing the center of the screen. Then, an intersection point between the two axes and an actual image appearing on the screen is extracted, based on which a virtual quadrangle is made.

Assuming that the virtual quadrangle is an original image without a keystone distortion, coordinates of the four angular points thereof are extracted and coordinates of four angular points of the actual image appearing on the screen. Then, four pairs of coordinates are obtained.

A relational expression (4) between the coordinate (U, V) before distortion and the coordinate (X, Y) after distortion is obtained by using the equation (1) as follows.

$$X = \frac{k_{11}U + k_{12}V + k_{13}}{k_{31}U + k_{32}V + 1} \quad (4)$$

$$Y = \frac{k_{21}U + k_{22}V + k_{23}}{k_{31}U + k_{32}V + 1}$$

which may be expressed as the following X-Y relation:

$$X=k_{11}U+k_{12}V+k_{13}-k_{31}UX-k_{32}VX$$
$$Y=k_{21}U+k_{22}V+k_{23}-k_{31}UY-k_{32}VY \quad (5)$$

As for the eight parameters ($k_{11}, k_{12}, \Lambda, k_{32}$), assuming that four pairs of coordinates are extracted as below by using the equation (5), ($U=u_0$, $V=v_0$)⇒($X=x_0$, $Y=y_0$)
($U=u_1$, $V=v_1$)⇒($X=x_1$, $Y=y_1$)
($U=u_2$, $V=v_2$)⇒($X=x_2$, $Y=y_2$)
($U=u_3$, $V=v_3$)⇒($X=x_3$, $Y=y_3$)

In case that the four pairs of coordinates are substituted, eight equations are obtained, which may be expressed by a matrix as shown in the below equation (6).

$$\begin{bmatrix} x_0 \\ x_1 \\ x_2 \\ x_3 \\ y_0 \\ y_1 \\ y_2 \\ y_3 \end{bmatrix} = \begin{bmatrix} u_0 & v_0 & 1 & 0 & 0 & 0 & -u_0x_0 & -v_0x_0 \\ u_1 & v_1 & 1 & 0 & 0 & 0 & -u_1x_1 & -v_1x_1 \\ u_2 & v_2 & 1 & 0 & 0 & 0 & -u_2x_2 & -v_2x_2 \\ u_3 & v_3 & 1 & 0 & 0 & 0 & -u_3x_3 & -v_3x_3 \\ 0 & 0 & 0 & u_0 & v_0 & 1 & -u_0y_0 & -v_0y_0 \\ 0 & 0 & 0 & u_1 & v_1 & 1 & -u_1y_1 & -v_1y_1 \\ 0 & 0 & 0 & u_2 & v_2 & 1 & -u_2y_2 & -v_2y_2 \\ 0 & 0 & 0 & u_3 & v_3 & 1 & -u_3y_3 & -v_3y_3 \end{bmatrix} \begin{bmatrix} k_{11} \\ k_{12} \\ k_{13} \\ k_{21} \\ k_{22} \\ k_{23} \\ k_{31} \\ k_{32} \end{bmatrix} \quad (6)$$

Accordingly, in order to obtain a keystone distortion parameters ($k_{11}, k_{12}, \Lambda, k_{32}$), an inverter matrix of the 8×8 matrix located at the right side of the equation (6) is used to express an equation related to $k_{11}, k_{12}, \Lambda, k_{32}$. In this respect, since an inverse-matrix of the 8×8 matrix necessarily exists, the equation (6) can be expressed by the following equation (7).

$$\begin{bmatrix} k_{11} \\ k_{12} \\ k_{13} \\ k_{21} \\ k_{22} \\ k_{23} \\ k_{31} \\ k_{32} \end{bmatrix} = \begin{bmatrix} u_0 & v_0 & 1 & 0 & 0 & 0 & -u_0x_0 & -v_0x_0 \\ u_1 & v_1 & 1 & 0 & 0 & 0 & -u_1x_1 & -v_1x_1 \\ u_2 & v_2 & 1 & 0 & 0 & 0 & -u_2x_2 & -v_2x_2 \\ u_3 & v_3 & 1 & 0 & 0 & 0 & -u_3x_3 & -v_3x_3 \\ 0 & 0 & 0 & u_0 & v_0 & 1 & -u_0y_0 & -v_0y_0 \\ 0 & 0 & 0 & u_1 & v_1 & 1 & -u_1y_1 & -v_1y_1 \\ 0 & 0 & 0 & u_2 & v_2 & 1 & -u_2y_2 & -v_2y_2 \\ 0 & 0 & 0 & u_3 & v_3 & 1 & -u_3y_3 & -v_3y_3 \end{bmatrix}^{-1} \begin{bmatrix} x_0 \\ x_1 \\ x_2 \\ x_3 \\ y_0 \\ y_1 \\ y_2 \\ y_3 \end{bmatrix} \quad (7)$$

Figure 7A:
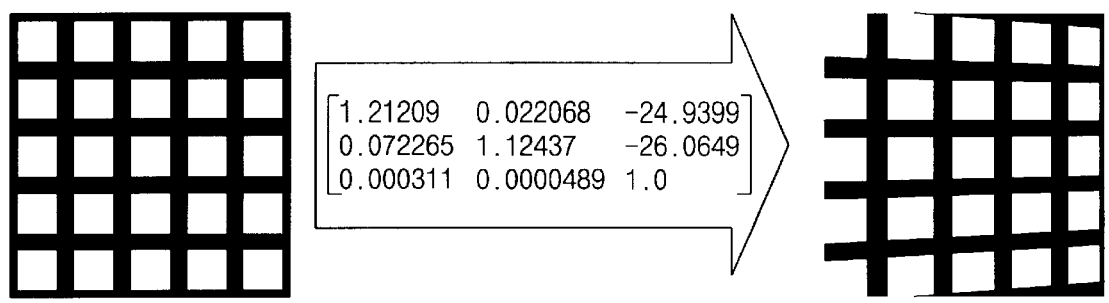
FIG. 7A is a view showing a keystone distorted image obtained by keystone-distorting an inputted image by using distortion correction information.

Accordingly, a keystone distortion can be modeled mathematically, and the keystone distortion parameter as shown in FIG. 7A can be obtained.

Meanwhile, the keystone distortion parameter is not obtained by one time. Thus, the keystone distortion parameter is successively updated to be converged to an accurate distortion parameter. In other words, a distortion is corrected by inverse-transformation by using an obtained distortion parameter, and a coordinate is extracted to obtain a new distortion pararrieter, based on which the previously obtained distortion parameter value is varied This process is repeatedly performed until an accurate keystone distortion parameter is obtained.

Assuming that the previously obtained keystone distortion parameter is 'M' and an additional keystone distortion parameter is $M_{add}$, $$M(l+1)=M_{add} \cdot M(l) \quad (8)$$

Wherein 'l' signifies an updated time.

In the above equation (8), 'M' indicates a projection transformation matrix. As shown in equation (1), a value of $M_{(3,3)}$ is always normalized as '1'. Therefore, in case that the obtained value of the $M(l+1)_{(3,3)}$ is not '1', 'M' is divided by $M(l+1)$ for normalization, so that an accurate keystone distortion parameter can be obtained.

2) Pincushion Distortion Modeling

Generally, a pincushion distortion has such characteristics that it is symmetrical up and down and right and left on the basis of the center of the screen and that the degree of distortion becomes severe as it goes away from the center of the screen.

Assuming that a coordinate of an original image is (U, V), a coordinate of a distorted image is (X, Y), since the distance from the center of the image is a critical factor for the pincushion distortion, $$\bar{U}=U-C_x$$
$$\bar{V}=V-C_y$$
$$r=[\bar{U}^2+\bar{V}^2]^{1/2} \quad (9)$$

Then, the coordinate (X, Y) of the distorted image can be expressed by the following equation (10) related to the distance:

$$X=U+\bar{U} \cdot (K_0^u + K_1^u \cdot r + K_2^u \cdot r^2 + K_3^u \cdot r^3 + \Lambda)$$
$$Y=V+\bar{V} \cdot (K_0^v + K_1^v \cdot r + K_2^v \cdot r^2 + K_3^v \cdot r^3 + \Lambda) \quad (10)$$

At this time, other parameters than $K_0$ and $K_2$ do not much contribute to modeling the pincushion distortion actually generated in the projection TV. Accordingly, the equation (10) can be simplified by the following equation (11):

$$X=U+\bar{U}(K_0^u + K_u^2 r^2)$$
$$Y=V+\bar{V}(K_0^v + K_v^2 r^2) \quad (11)$$

In the above equation, $K_0$ is a parameter related to a distortion of scaling of an image In case that $K_0$ is greater than '0', it signifies a distortion that an image is scaled up, while, in case that $K_0$ is smaller than '0', it signifies a distortion that an image is scaled down.

$K_2$ is a parameter related to a distortion that a straight line is warped. In case that $K_2$ is greater than '0', a straight line is concavely distorted, while, in case that $K_2$ is smaller than '0', a straight line is convexly distorted.

Figure 7B:
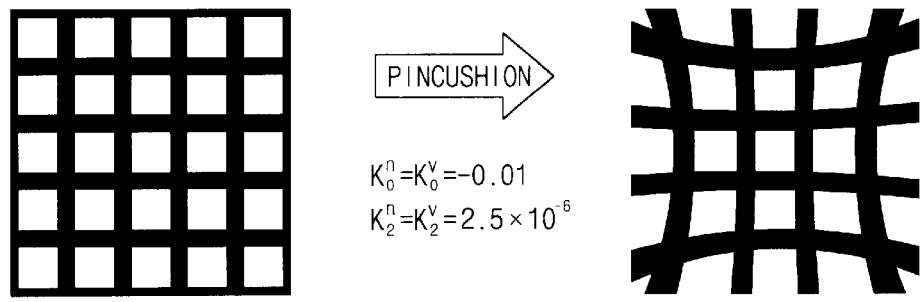
FIG. 7B is a view showing a pincushion distorted image obtained by pincushion-distorting an inputted image by using distortion correction information.

Generally, $K_0$ and $K_2$ have characteristics that their absolute values are in the range of $10^{-2} \sim 10^{-3}$ and $10^{-6} \sim 10^{-7}$, respectively. And, as shown in FIG. 7B, a distorted image having a pincushion distortion parameter of $K_0^u = K_0^v = -0.01$ and $K_2^u = K_2^v = 2.5 \times 10^{-6}$ is displayed.

As shown in equation (11), four parameters of $K_0^u, K_2^u, K_0^v, K_2^v$ should be determined in the pincushion distortion modeling. Accordingly, it is necessary to extract two pairs of coordinates. The equation (11) may be rewritten by the following equations (12) and (13).

$$\frac{X-U}{\bar{U}} = K_0^u + r^2 \cdot K_2^u \quad (12)$$

$$\frac{Y-V}{\bar{V}} = K_0^v + r^2 \cdot K_2^v \quad (13)$$

At this time, $\bar{U}, \bar{V}$ signify $U-U_{center}$, $V-V_{center}$, respectively.

In order to obtain the distortion parameter, $K_0^u, K_2^u, K_0^v, K_2^v$, it is assumed that a pair of coordinates before and after distortion are extracted as follows.

$$(U=u_0, V=v_0) \Rightarrow (X=x_0, Y=y_0)$$

$$(U=u_1, V=v_1) \Rightarrow (X=x_1, Y=y_1) \quad (14)$$

When the above values of equation (14) are substituted to the equations (12) and (13), the following equation (15) is obtained. Thus, when the inverse-matrix of the 4×4 matrix positioned in the right side of the equality is obtained and expressed by an equation related to $K_0^u, K_2^u, K_0^v, K_2^v$, the following equation (16) is obtained.

$$\begin{bmatrix} \frac{x_0 - u_0}{u_0 - U_{center}} \\ \frac{x_1 - u_1}{u_1 - U_{center}} \\ \frac{y_0 - v_0}{v_0 - V_{center}} \\ \frac{y_0 - v_0}{v_0 - V_{center}} \end{bmatrix} = \begin{bmatrix} 1 & u_0^2 + v_0^2 & 0 & 0 \\ 1 & u_1^2 + v_1^2 & 0 & 0 \\ 0 & 0 & 1 & u_0^2 + v_0^2 \\ 0 & 0 & 1 & u_1^2 + v_1^2 \end{bmatrix} \begin{bmatrix} K_0^u \\ K_2^u \\ K_0^v \\ K_2^v \end{bmatrix} \quad (15)$$

$$\begin{bmatrix} K_0^u \\ K_2^u \\ K_0^v \\ K_2^v \end{bmatrix} = \frac{1}{(u_1^2 + v_1^2) - (u_0^2 + v_0^2)} \begin{bmatrix} u_1^2 + v_1^2 & -(u_0^2 + v_0^2) & 0 & 0 \\ -1 & 1 & 0 & 0 \\ 0 & 0 & u_1^2 + v_1^2 & -(u_0^2 + v_0^2) \\ 0 & 0 & -1 & 1 \end{bmatrix} \begin{bmatrix} \frac{x_0 - u_0}{u_0 - U_{center}} \\ \frac{x_1 - u_1}{u_1 - U_{center}} \\ \frac{y_0 - v_0}{v_0 - V_{center}} \\ \frac{y_0 - v_0}{v_0 - V_{center}} \end{bmatrix} \quad (16)$$

In the case where the above described method is employed to obtain a pincushion distortion parameter, a value of about 70%~80% of an accurate pincushion distortion parameter value is possibly obtained, not the accurate value. Thus, after a distortion parameter is roughly obtained, an algorithm is required to update the value successively until it comes close to the accurate value.

However, as is noted in the equation (11), since there is two pincushion distortion parameters in a single equation, it is very difficult to update the two parameters at a time. Accordingly, a process for obtaining a pincushion distortion parameter is divided into two steps, so that after a detailed parameter is obtained in each step, based on which an overall pincushion distortion parameter is obtained.

As aforementioned, there are two kinds of distortions: one is a distortion that an image is scaled up or down, and the other is a distortion that a straight line is warped to be a curved line.

First, it is assumed that after a straight line is warped to be a curved line and then there is a distortion that an image is scaled up or down.

a) a parameter related to the warping of the straight line is as follows:

$$U' = U + \bar{U} \cdot (C_1^u \cdot (\bar{U}^2 + \bar{V}^2)) \quad (17)$$

$$V' = V + \bar{V} \cdot (C_1^v \cdot (\bar{U}^2 + \bar{V}^2)) \quad (18)$$

b) a parameter related to the scaling up and down is as follows:

$$X = U' + C_2^u \cdot \bar{U}' \quad (19)$$

$$V' = V + \bar{V} \cdot (C_1^v \cdot (\bar{U}^2 + \bar{V}^2 \quad (18)$$

In this respect, a relational expression between $C_1, C_2$ and $K_0, K_2$ of the pincushion distortion modeling of equation (11) is obtained by the following equations (21) and (22).

$$K_0^u = C_2^u, K_2^u = C_1^u \cdot (1 + C_2^u) \quad (21)$$

$$K_0^v = C_2^v, K_2^v = C_1^v \cdot (1 + C_2^v) \quad (22)$$

After rough values for $K_0$ and $K_2$ are obtained in the same manner as described above, the obtained values are substituted to the equations (21) and (22), to obtain rough values for the $C_1$ and $C_2$.

Meanwhile, after $C_1$ and $C_2$ are updated to accurate values, final pincushion distortion parameters $K_0$ and $K_2$ can be obtained by using a following method (b-1 A First-Step Pin Cushion Distortion Correction (a Method for Updating Distortion Parameters ($C_1^u, C_1^v$) Related to the Warping of a Straight Line)

In a first-step distortion correction algorithm, $C_1^u, C_1^v$ are successively updated to a new value, based on which a distortion is corrected. This process is repeatedly performed until a warped line to be corrected to a straight line.

In this respect, in order to detect whether a line is straight or not, the fact that points in the same line always have the same slope is utilized.

Accordingly, at least three coordinates are extracted from a line and slopes between points are measured. When the slopes between points are the same with each other, the three points exist in the same line. Namely, on the assumption that extracted three points are $(x_0, y_0)$, $(x_1, y_1)$, $(x_2, y_2)$, respectively, $C_1^u, C_1^v$ are repeatedly updated until the relation of, $$\frac{y_0 - y_1}{x_0 - x_1} \approx \frac{y_1 - y_2}{x_1 - x_2}$$

is satisfied.

Equations (23) (24) for updating $C_1^u, C_1^v$ are as follows:

$$C_1^u(l+1) = C_1^u(l) \pm \Delta_1^u \quad (23)$$

$$C_1^v(l+1) = C_1^v(l) \pm \Delta_1^v \quad (24)$$

In this case, after a distortion is corrected with the values of $C_1^u, C_1^v$ if there exists a concave distortion, the sign of $\Delta^1$ is set as a positive number, while, if there exists a convex distortion, the sign of $\Delta_1$ is set as a negative number.

(b-2) A Second-Step Pincushion Distortion Correction (Process for Obtaining Accurate Values of $C_2^u, C_2^v$)

In a second-step algorithm, $C_2^u, C_2^v$ are successively updated to a net value, based on which a distortion is corrected. This process is repeatedly performed until the size of a scaled-up or scaled-down image is determined suitable to the screen.

Whether the image size is suitable to the screen or not is determined by using the distance between the outermost line of the image and the marginal portion of the screen. The following equations (25) and (26) are relational expression for updating $C_2{}^u, C_2{}^v$ to new values.

$$C_2{}^u(l+1) = C_2{}^u(l) \pm \Delta_2{}^u \qquad (25)$$

$$C_2{}^v(l+1) = C_2{}^v(l) \pm \Delta_2{}^u \qquad (26)$$

At this time, in case that the outermost line of a corrected line is displayed smaller than the screen, the sign of $\Delta_2$ is set as a negative number, while in case that the outermost line of a corrected line is displayed greater than the screen, the sign of $\Delta_2$ is set as a positive number.

In the method for extracting distortion correction information by means of the distortion correcting apparatus of the present invention as described above, as shown in FIG. 5A, the keystone distortion correction information is first obtained and then the pincushion distortion correction information is obtained. Meanwhile, in case that, after the keystone distortion correction information is obtained, a keystone distortion is detected in the course of obtaining the pincushion distortion correction information, keystone distortion correction information is newly obtained to update the previously information.

Also, in the method for extracting distortion correction information by means of the distortion correcting apparatus of the present invention, as shown in FIG. 5B, in a state that an image having both a keystone distortion and a pincushion distortion is inputted and one distortion, for example, a pincushion distortion, is first corrected so that the pincushion distortion is removed, keystone distortion correction information is obtained. Or, conversely, in a state that an image having both a keystone distortion and a pincushion distortion is inputted and the keystone distortion is corrected so that the keystone distortion is removed, a pincushion distortion correction information is obtained. That is, the keystone distortion information and the pincushion distortion are obtained in turn.

Figure 9:
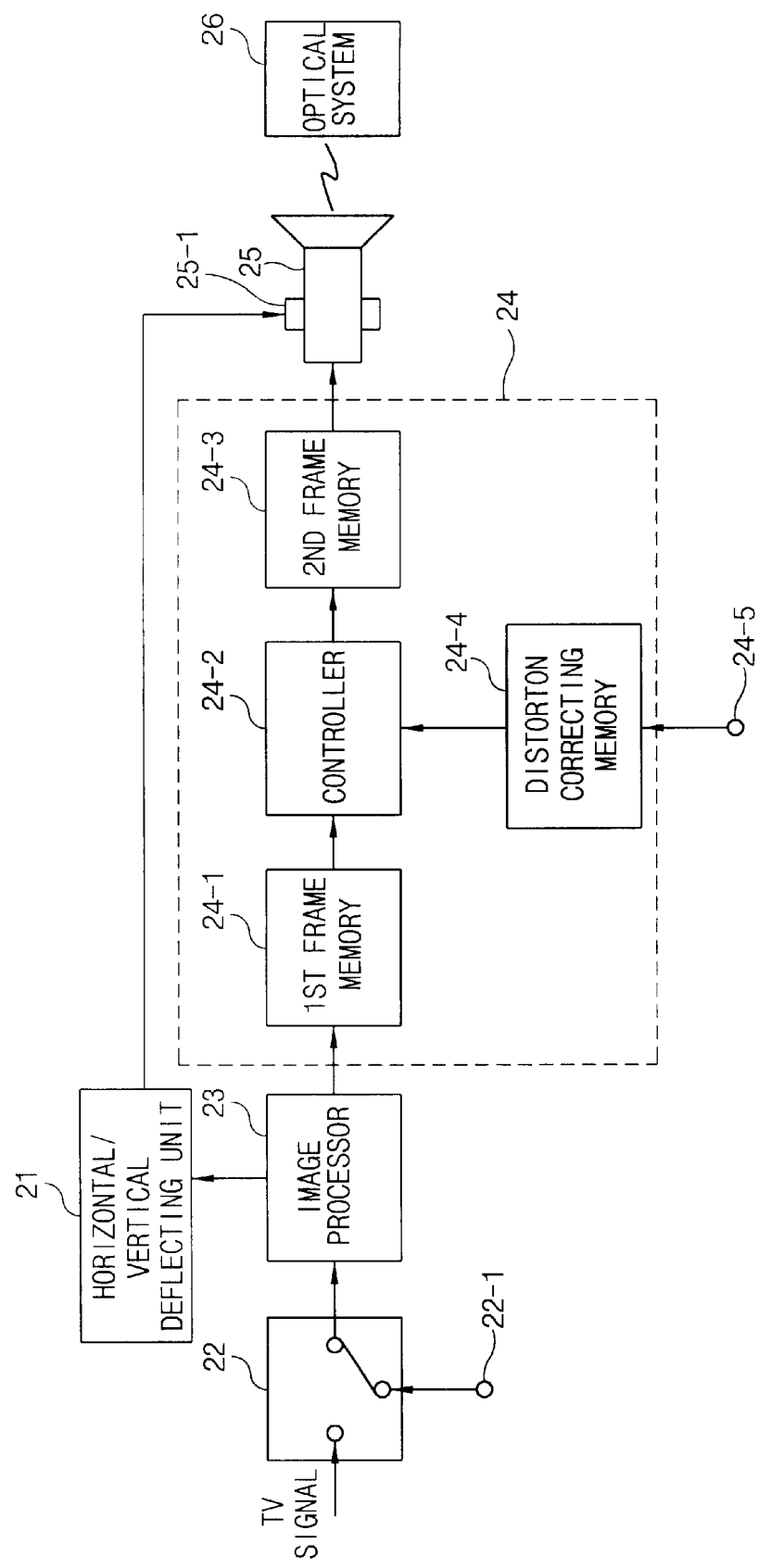
FIG. 9 is a schematic block diagram of an image displayer in accordance with the present invention.

FIG. 9 is a schematic block diagram of an image displayer in accordance with the present invention.

As shown in the drawing, the image displayer of the present invention includes an image processor 23 for processing a signal received from a signal source and outputting an image signal and a horizontal or a vertical synchronous signal; a horizontal/vertical deflection unit 21 for receiving the horizontal or the vertical synchronous signal and outputting a convergence control signal and a horizontal or a vertical deflection control signal; a prewarping unit 24 for prewarping the image signal outputted from the image processor 23 in advance and outputting a prewarped image; a CRT 25 for receiving the prewarped image and outputting an electron beam; a deflection yoke (DY) 25-1 attached to the CRT 25 for controlling the electron beam outputted from the CRT 25 according to the horizontal or the vertical synchronous signal; and an optical system 26 for receiving the electron beam controlled by the deflection yoke 25-1 and displaying an enlarged image.

The prewarping unit 24 includes a first frame memory 24-1 for storing the image signal outputted from the image processor 23 in a frame unit; a distortion correcting memory 24-4 for storing distortion correction information to correct a distortion possibly occurring for the image signal outputted from the image processor 23, a controller 24-2 for interpolating the image stored in the first frame memory 24-1 on a real time basis and prewarping it by using the distortion correction information stored in the distortion correcting memory 24-4; and a second frame memory 24-3 for storing the image prewarped by the controller 24-2.

In addition, the image displayer of the present invention further includes a switch 22 installed before the image processor 23, so that a predetermined reference image required for extracting distortion information can be inputted thereto.

The distortion correcting memory 24-4 includes an input terminal 24-5 for receiving a signal from an external source, and the switch 22 includes an input terminal 22-1 for receiving the reference image.

Figure 10:
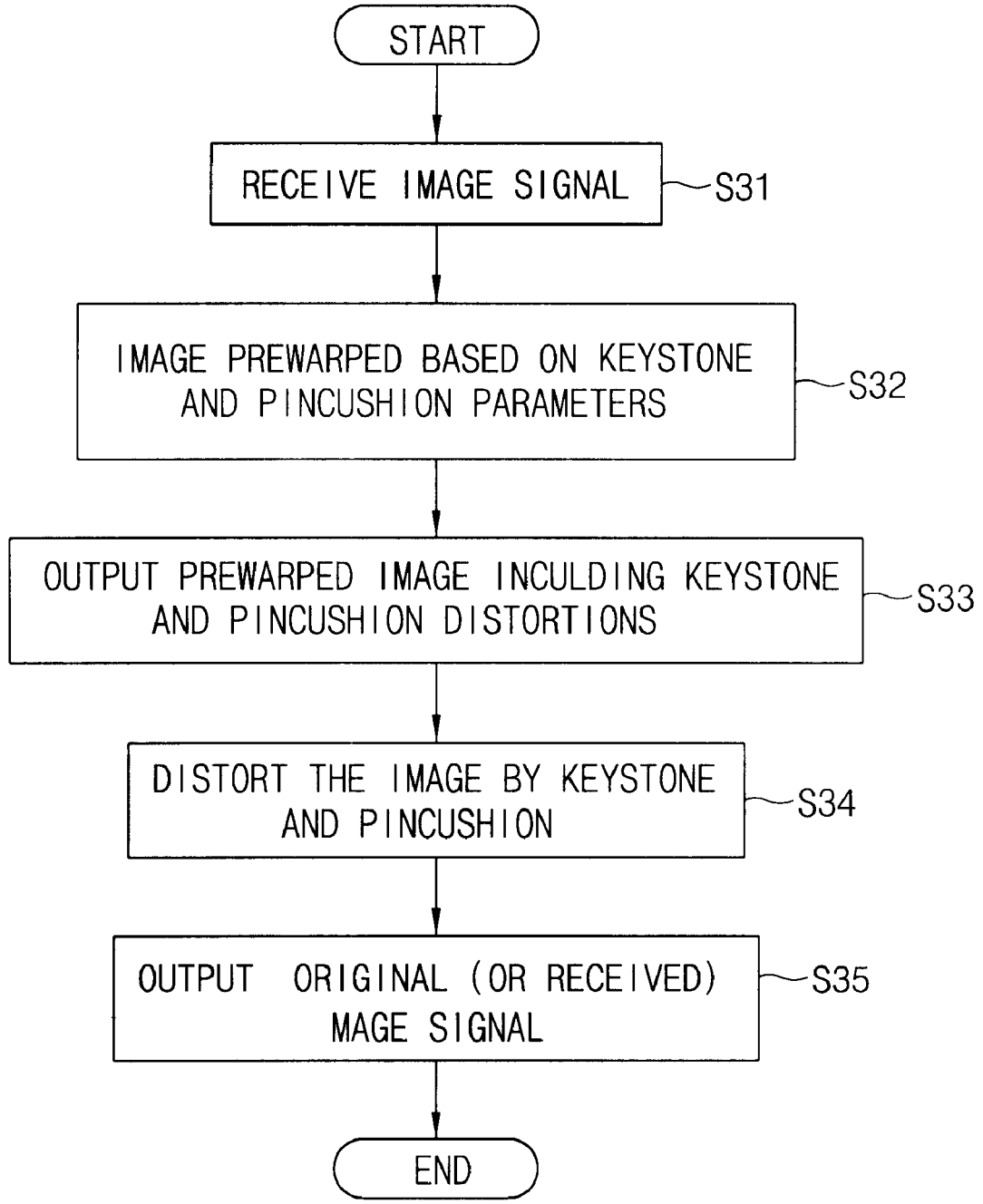
FIG. 10 is a flow chart of a method for correcting a distorted image of the image displayer in accordance with the present invention.

The operation of the image displayer constructed as described above will now be explained with reference to FIGS. 10 through 12.

Figure 11A:
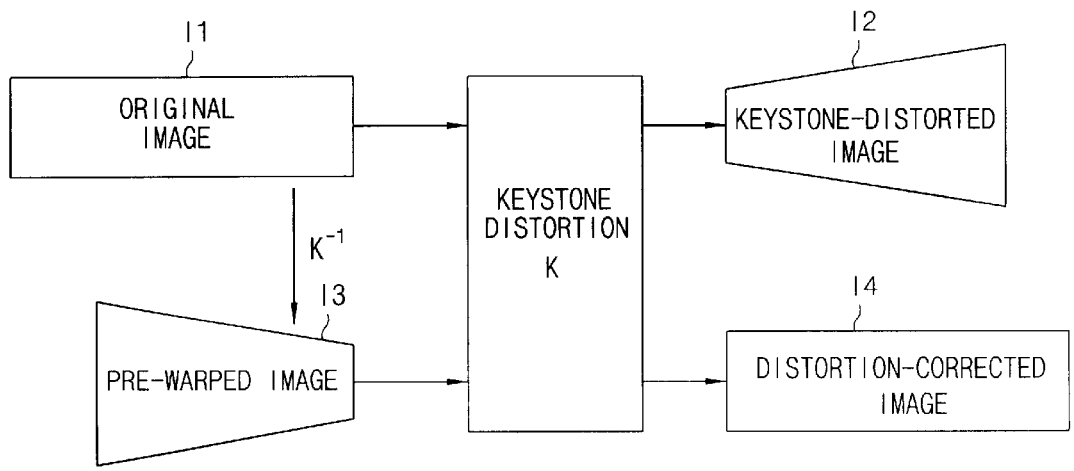
FIGS. 11A and 11B show a distortion correcting process of the image displayer in accordance with the present invention.
Figure 11B:
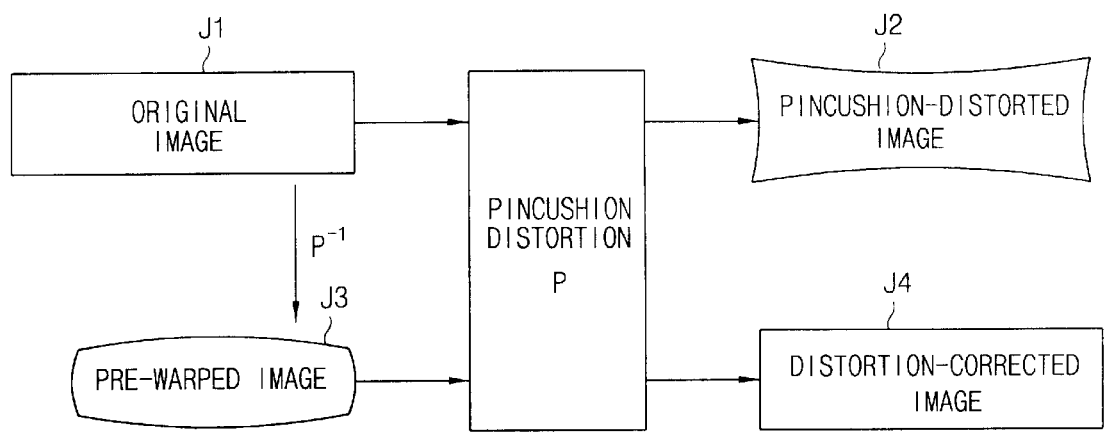

As shown in FIG. 11, when the image displayer receives an original image 11 and outputs it to the screen, an image 12 with a keystone distortion is outputted Thus, in order to compensate the keystone distortion, as shown in FIGS. 4, 5A and 5B, the keystone distortion is analyzed. And then, before the original image is subject to a keystone distortion, an image 13 is generated by prewarping the original image. And, when the keystone-prewarped image 13 passes through the optical system of the image displayer which makes a keystone distortion, a keystone distortion-corrected image 14 is outputted. Accordingly, the keystone distortion-corrected image 14 is identical to the. original image 11 as inputted to the image displayer.

Likewise, the image displayer of the present invention receives an original image J1 and outputs it to the screen, an image J2 with a pincushion distortion is outputted. Thus, in order to compensate the pincushion distortion, as described above with reference to FIGS. 4, 5A and 5B, after the pincushion distortion is analyzed, an image J3 is generated by prewarping the original image before the original image is subject to the pincushion distortion. And then, when the pincushion prewarped image J3 passes through the optical system of the image displayer which makes a pincushion distortion, a pincushion distortion-corrected image J4 is outputted. Accordingly, the pincushion distortion-corrected image J4 is identical to the original image J1 as inputted to the image displayer.

The process for inputting an original image, prewarping it and outputting a prewarped image will now be described in detail.

Figure 12A:
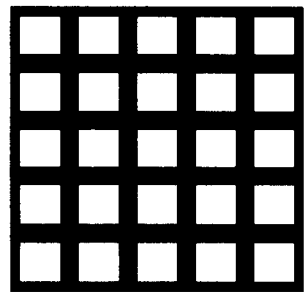
FIGS. 12A to 12D show images generated according to the distortion correcting process of the image displayer in accordance with the present invention.

When the image processor 23 receives a signal (i.e., a grid signal as shown in FIG. 12A, etc.) from an external source, it outputs an image signal and a vertical or a horizontal synchronous signal. Then, the first frame memory 24-1 stores the image signal in a frame unit (S31).

At this time, the controller 24-2 receives the distortion correction information of the image displayer stored in the distortion correcting memory 24-4 as obtained with reference to FIGS. 4, 5A and 5B, and prewarps the image data in frame unit stored in the first frame memory 24-1 and outputs it.

Figure 12B:
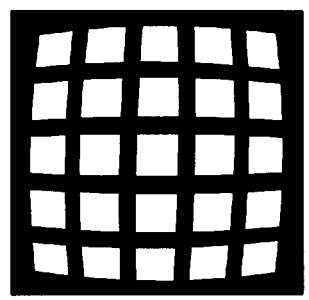
Figure 12C:
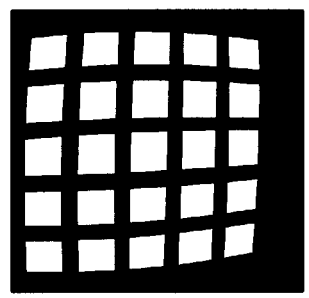

That is, the controller 24-2 interpolates the frame data stored in the first frame memory 24-1 on the basis of the distortion correction information stored in the distortion correcting memory 24-4 on a real time basis and keystone-prewarps it as shown in FIGS. 12B and/or 12C, and at the same time, stores a prewarped-image frame data generated according to pincushion prewarping in the second frame memory 24-3 (S32).

When the second frame memory 24-3 outputs the prewarped-image frame data generated as the inputted image signal is prewarped, to the CRT 25, the CRT 25 outputs an electron beam to the optical system 26 to output an enlarged image (S33).

Figure 12D:
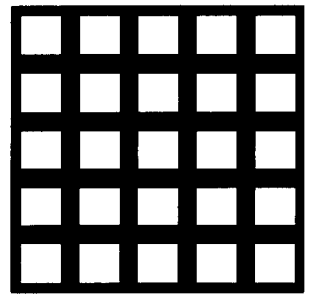

The prewarped image is then keystone-distorted and pincushion-distorted by the CRT 25 and the optical system 26, so that the same image as shown in FIG. 12D as the original input image (FIG. 12A) is outputted by the image displayer (S34, S35).

At this time, the deflection yoke 25-1 of the CRT 26 controls the direction of the electron beam outputted from the CRT according to the vertical or the horizontal deflection control signal outputted from the vertical/horizontal deflection unit, according to which the CRT outputs an enlarged image to the optical system.

The process of generating a keystone prewarped image will now be described in detail.

As defined above, it is assumed that (U, V) is a coordinate of an original image and ($X_{dis}$, $Y_{dis}$) is a coordinate of a distorted image, and ($U_{inv}$, $V_{inv}$) is a coordinate of a prewarped image. Then, the following equations are obtained from the equation (1).

$$\begin{bmatrix} X'_{dis} \\ Y'_{dis} \\ Z'_{dis} \end{bmatrix} = K \begin{bmatrix} U \\ V \\ 1 \end{bmatrix} \qquad (27)$$

$$\begin{bmatrix} X_{dis} \\ Y_{dis} \end{bmatrix} = \begin{bmatrix} X'_{dis}/Z'_{dis} \\ Y'_{dis}/Z'_{dis} \end{bmatrix} \qquad (28)$$

$$\begin{bmatrix} U'_{inv} \\ V'_{inv} \\ W'_{inv} \end{bmatrix} = K^{-1} \begin{bmatrix} U \\ V \\ 1 \end{bmatrix} \qquad (29)$$

$$\begin{bmatrix} U_{inv} \\ V_{inv} \end{bmatrix} = \begin{bmatrix} U'_{inv}/W'_{inv} \\ V'_{inv}/W'_{inv} \end{bmatrix} \qquad (30)$$

Equations (27) and (28) shows a relation between the coordinate of the original image and the coordinate of the distorted image, and equations (29) and (30) shows-a relation between the coordinate of the original image and the coordinate of the prewarped image.

In order to obtain a prewarped image, it is necessary to know which coordinate of the original image has been warped to a pixel coordinate of the prewarped image That is, in equations (29) and (30), in case that $U_{inv}$, and $V_{inv}$ are pixel coordinate, it is to be known at which coordinate (U, V) the inputted image is warped.

On the assumption-that a specific pixel coordinate of a prewarped image is ($U_{out}$, $V_{out}$) and a coordinate of an original image creating the coordinate is ($U_{in}$, $V_{in}$), equations (29) and (30) can be rewritten by the following equations (31) and (32).

$$\begin{bmatrix} U'_{in} \\ V'_{in} \\ W'_{in} \end{bmatrix} = K \begin{bmatrix} U_{out} \\ V_{out} \\ 1 \end{bmatrix} \qquad (31)$$

$$\begin{bmatrix} U_{in} \\ V_{in} \end{bmatrix} = \begin{bmatrix} U'_{in}/W'_{in} \\ V'_{in}/W'_{in} \end{bmatrix} \qquad (32)$$

That is, in order to obtain the prewarped image, it is necessary to know from which coordinate of the original image the pixel coordinate of the prewarped image has been warped through a forward transformation (K).

In case that a coordinate is (m, n), when it is assumed that a pixel value of an original image is f((m, n)) and a pixel value of a prewarped image is g((m, n)), the following equation (33) is obtained from the equations (31) and (32).

$$g((U_{out}, V_{out})) = f((U_{in}, V_{in})) \qquad (33)$$

What is to be actually performed is to create a prewarped image. That is, since it is necessary to know a pixel value of the prewarped image, g(($U_{out}$, $V_{out}$)) should be known first. As noted in equation (33), G(($U_{out}$, $V_{out}$)) is equal to f(($U_{in}$, $V_{in}$)), by which, thus, g(($U_{out}$, $V_{out}$)) can be obtained.

In this respect, however, since the coordinate ($U_{in}$, $V_{in}$) of the original image related to the integer ($U_{out}$, $V_{out}$) is generally not an integer, it is not possible to obtain F(($U_{in}$, $V_{in}$)), and accordingly, it is not possible to obtain g(($U_{out}$, $V_{out}$)). In this case, the pixel value of the prewarped image can be obtained by interpolation.

The process of generating a pincushion prewarping image with respect to a pincushion distortion will now be described in detail.

In order to obtain a prewarped image, it is necessary to know at which coordinate the pixel of a prewarped image has been warped. Thus, a coordinate of an original image corresponding to the pixel of a prewarped image is searched by using a forward transformation 'P', and an image can be generated by interpolation.

As defined above, assuming that a coordinate of a prewarped image is ($U_{out}$, $V_{out}$) and a coordinate of an original image is ($U_{in}$, $V_{in}$), since ($U_{in}$, $V_{in}$) forms ($U_{out}$, $V_{out}$) through 'P', the following equation (34) is obtained:

$$U_{in} = U_{out} + \bar{U}_{out} \cdot (K_0^u + K_2^u r_{out}^2)$$

$$V_{in} = V_{out} + \bar{V}_{out} \cdot (K_0^v + K_2^v r_{out}^2) \qquad (34)$$

Wherein $\bar{U}_{out} = U_{out} - C_x$ $\bar{V}_{out} = V_{out} - C_y$ $r_{out} = (\bar{U}_{out}^2 + \bar{V}_{out}^2)^{1/2}$ By using the above relational expression, ($U_{in}$, $V_{in}$) corresponding to ($U_{out}$, $V_{out}$) can be obtained. A pixel value of a prewarped image can be searched by using the equation (33) which shows a relation between corresponding coordinates, and accordingly, an image can be generated In this case, generally, ($U_{in}$, $V_{in}$) is not an integer coordinate, so that a pixel value is searched by interpolation (i.e., a bilinear interpolation).

As so far described, according to the apparatus and method for correcting a distorted image of the present invention, a distorted image of every image displayer can be detected and accurately corrected. And, for an image displayer in which an image distortion occurs after time elapses, the image displayer can be corrected to output a corrected image.

Moreover, according to the image displayer of the present invention, a distorted image is detected and image correction inforamtion is stored in a memory, based on which an input image is prewarped, so that the image can be corrected without using a convergence yoke. Thus, instead of using an analog circuit such as a voluminous coil and an amplifier which are installed to drive a convergence yoke of a CRT, the image displayer uses a digital signal procesing chip for simply processing an image, so that the image displayer can be reduced in size and economical. Therefore, a problem caused due to the aging process of components in the analog circuit can be overcome, and its technique can be adopted for an LCD projection TV.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the meets and bounds of the claims, or equivalence of such meets and bounds are therefore intended to be embraced by the appended claims.

What is claimed is:

1. An image displayer comprising:
   an image processor for processing a signal from a signal source and outputting an image signal and a horizontal or a vertical synchronous signal;
   a prewarping unit for prewarping the image signal outputted from the image processor and outputting a prewarped image signal; and
   a display unit for receiving the prewarped image and displaying a corresponding image without distortion;
   wherein the prewarping unit includes a memory which stores distortion correction information for correcting a distortion possibly included in an image signal, the distortion correction information being obtained by comparing the image signal and a reference image signal and extracting keystone distortion parameters or pincushion distortion parameters when there is a keystone distortion or pincushion distortion in the image signal.

2. The image displayer according to claim 1, wherein the prewarping unit includes a memory which stores distortion correction information being obtained by prewarping an image signal in advance.

3. The image displayer according to claim 2, wherein the prewarping unit comprising:
   a first frame memory for storing an image signal by frame unit outputted from the image processor;
   a controller for interpolating the image signal by frame unit outputted from the first frame memory and prewarping it according to the distortion correction information; and
   a second frame memory for storing the prewarped image signal by frame unit.

4. The image displayer according to claim 1, wherein the display unit comprising:
   a CRT for receiving the prewarped image and outputting an electron beam; and
   an optical system for receiving the electron beam and displaying an enlarged image.

5. The image displayer according to claim 4, wherein the optical system comprising:
   a lens of the CRT;
   a mirror for making the electron beam incident on and reflecting it; and
   a screen for making incident the electron beam made incident on the mirror and displaying an image.

6. The image displayer according to claim 1, further comprising:
   a vertical/horizontal deflection unit for receiving the horizontal or the vertical synchronous signal and outputting a horizontal or a vertical deflection control signal;
   a deflection yoke attached to the display unit for controlling the electron beam outputted from the display unit according to the horizontal or the vertical synchronous signal; and
   an optical system for receiving the light of the image scanned by the electron beam controlled by the deflection yoke and displaying an enlarged image.

7. The image displayer according to claim 1, further comprising a switch for receiving a predetermined reference signal to test an image distortion.

8. A method for correcting a distortion image comprising the steps of:
   prewarping an inputted image by using pre-set distortion correction information to create a prewarped image signal; and
   displaying the prewarped image corresponding to the prewarped image signal;
   wherein the step of prewarping includes the steps of:
   obtaining an image by mathematically modeling a relation between a predetermined reference image and a distorted image, the distorted image being obtained by displaying the reference image on a screen and comparing the images to detect distortion information; and
   correcting the distorted image to be identical to the reference image based on the distortion information.

9. The method according to claim 8, wherein the distortion correction information is to correct a pincushion distortion and a keystone distortion of an image displayer.

10. The method according to claim 9, wherein the step of prewarping includes the step of:
    processing a keystone-prewarped image; and
    processing a pincushion-prewarped image.

11. An image displayer comprising:
    an image processor to process a signal and output an image signal and a horizontal synchronous signal or a vertical synchronous signal;
    a prewarping unit to prewarp the image signal output from the image processor and to output a prewarped image signal, the prewarping unit including a memory device to store distortion correction information for correcting distortion in an image signal, the distortion correction information being based on comparing the image signal and a reference image signal and extracting keystone distortion parameters or pincushion distortion parameters; and
    a display unit to receive the prewarped image and to display a corresponding image without distortion.

12. The image displayer according to claim 11, wherein the memory stores the distortion correction information that is obtained by prewarping the image signal in advance.

13. The image displayer according to claim 12, wherein the prewarping unit comprises:
    a first frame memory to store an image signal by frame unit outputted from the image processor;
    a controller to interpolate the image signal by frame unit outputted from the first frame memory and prewarping it according to the distortion correction information; and
    a second frame memory to store the prewarped image signal by frame unit.

14. The image displayer according to claim 11, wherein the display unit comprises:
    a CRT to receive the prewarped image and output an electron beam; and
    an optical system to receive the electron beam and display an image.

15. The image displayer according to claim 14, wherein the optical system comprises:
    a lens of the CRT;

a mirror to reflect the electron beam; and a screen to display an image.

16. The image displayer according to claim 11, further comprising:
- a vertical/horizontal deflection unit to receive the horizontal synchronous signal or the vertical synchronous signal and outputting a horizontal deflection control signal or a vertical deflection control signal;
- a deflection yoke coupled to the display unit to control the electron beam outputted from the display unit according to the horizontal synchronous signal or the vertical synchronous signal; and
- an optical system to receive the light of the image scanned by the electron beam controlled by the deflection yoke and to display an enlarged image.

17. The image displayer according to claim 11, further comprising a switch to receive a predetermined reference signal to test an image distortion.

* * * * *